United States Patent
Takehara

(10) Patent No.: US 7,277,367 B2
(45) Date of Patent: Oct. 2, 2007

(54) TRACKING ERROR DETECTION DEVICE AND TRACKING ERROR DETECTION METHOD FOR OPTICAL DISK APPARATUS

(75) Inventor: Shintaro Takehara, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 625 days.

(21) Appl. No.: 10/782,799

(22) Filed: Feb. 23, 2004

(65) Prior Publication Data
US 2004/0252600 A1  Dec. 16, 2004

(30) Foreign Application Priority Data
Feb. 26, 2003 (JP) ............... 2003-050095

(51) Int. Cl.
G11B 7/00 (2006.01)
(52) U.S. Cl. ............... 369/44.35; 369/44.41; 369/44.29
(58) Field of Classification Search ............ None
See application file for complete search history.

(56) References Cited

U.S. PATENT DOCUMENTS 6,266,303 B1 * 7/2001 Buchler .............. 369/44.29
6,707,772 B1   3/2004 Marrec et al.

FOREIGN PATENT DOCUMENTS

| EP | 0 320 975 A2 | 6/1989 |
|---|---|---|
| EP | 1 067 525 A2 | 1/2001 |
| JP | 8-87758 | 4/1996 |
| JP | 9-259531 | 10/1997 |
| JP | 10-134519 | 5/1998 |
| JP | 2001-34969 | 2/2001 |
| JP | 2001-56945 | 2/2001 |
| JP | 2001-110144 | 4/2001 |
| WO | WO 2004/095440 A1 | 11/2004 |

* cited by examiner

Primary Examiner—Wayne Young
Assistant Examiner—Adam R. Giesy
(74) Attorney, Agent, or Firm—Oblon, Spivak, McClelland, Maier & Neustadt, P.C.

(57) ABSTRACT

A tracking error detection device for an optical disk apparatus comprises a detecting unit which includes at least two detectors and detects a reflected light from a series of pits formed on an optical disk, a phase comparing unit which detects a phase difference of outputs of the at least two detectors, and a low-pass filter which smoothes an output of the phase comparing unit, a cut-off frequency of the low-pass filter being higher than a frequency at which a spectrum of a modulation code recorded in the optical disk becomes −10 dB and lower than a frequency at which the spectrum of the modulation code recorded in the optical disk becomes −5 dB.

8 Claims, 5 Drawing Sheets

TRACKING ERROR DETECTION DEVICE AND TRACKING ERROR DETECTION METHOD FOR OPTICAL DISK APPARATUS

CROSS-REFERENCE TO RELATED APPLICATIONS

This application is based upon and claims the benefit of priority from prior Japanese Patent Application No. 2003-050095, filed Feb. 26, 2003, the entire contents of which are incorporated herein by reference.

BACKGROUND OF THE INVENTION

1. Field of the Invention

The present invention relates to a tracking error detection device and a tracking error detection method for an optical disk apparatus.

2. Description of the Related Art

In reproducing an optical disk in which a series of pits or marks (hereinafter generally referred to as pits) is formed according to recording data in the form of coded modulation, the series of pits is irradiated with a laser beam. The data is reproduced on the basis of reflected light of the laser beam. Since it is necessary to track an objective lens so that the laser beam does not go out of the series of pits, a tracking error signal is obtained from the reflected light. For a conventional example of the tracking error detection device, there is the device based on a DPD TE (Differential Phase Detection Tracking Error) method (For example, paragraphs 0020 to 0028 in Japanese Patent Application KOKAI Publication No. 2001-34969).

In the DPD TE method, a quadrant photodetector detects the light which is reflected from an edge of the pit. Each of two detection signals obliquely opposite to each other relative to the center of the photodetector is added, a waveform of the added signals is equalized with an equalizer, and then the equalized signal is binarized with a binarizing circuit. Phase difference between two binarized signals (a pulse signal of a pulse width according to the series of pits) obtained in above-mentioned way is determined with a phase comparator to obtain a phase-difference detection signal. Since the phase-difference detection signal generates a pulse having a length according to the amount of phase error at timing when a code is inverted, a modulation component of the recording data contained in the phase-difference detection signal, i.e., a high frequency component relative to a servo band is removed by smoothing the phase-difference detection signal with a low-pass filter, and a tracking error signal according to deviation between the laser beam and the series of pits is generated by determining the difference between the two binarized signals with a differential amplifier having a gain of 1.

A modulation coding method of current DVD (Digital Versatile Disk) is an 8/16 modulation coding method. Run-length ranges from 2 to 10 (RLL (2, 10)). RLL (2, 10) means that at least two "0"s (ten "0"s at the maximum) are present between adjacent "1" and "1" and a minimum mark length of the pit corresponds to the three codes. The above-mentioned tracking error detection device correctly functions to the current DVD.

In recent years, standards of a next-generation DVD having a higher recording density have been proposed. In the next-generation DVD, a 4/6 or 8/12 modulation coding is adopted. The run-length ranges 1 to 10 (RLL (1, 10)). The 4/6 or 8/12 modulation code is one which can increase modulation efficiency to record the information in higher density. The 4/6 or 8/12 modulation code has a spectrum of a frequency component lower than that of the modulation code used in the DVD standard relative to a channel bit frequency. Therefore, noise in the high frequency component relative to the servo band remains in the tracking error signal, and the deviation between the laser beam and the pit can not be correctly detected.

Except the above-mentioned method, the tracking error detection method of the differential phase detection method also includes following methods:

1) A method in which the waveform of an output signal from each detection element is equalized with the equalizer without performing addition, the phase difference is independently calculated in back and forth direction of the detector corresponding to the series of pits, and the obtained phase difference signal is added to pass it through the low-pass filter;

2) A method in which the phase difference between a PLL (Phase Locked Loop) clock of an RF signal and an equalizing signal in which the waveform of each output signal from each detection element is equalized with the equalizer is calculated, and the obtained phase difference signal is added and subtracted to pass it through the low-pass filter. The same problem is generated in any method, because the modulation component of the phase difference signal, i.e., the high frequency component relative to the servo band is removed with the low-pass filter.

Thus, in the tacking error detection device using the conventional differential phase detection method, there is the problem that, when the minimum mark length is shortened in order to increase the recording density of the optical disk, the phase difference signal can not be smoothed and the modulation component of the recording code included in the phase difference signal, i.e., the high frequency component relative to the servo band remains as the noise.

BRIEF SUMMARY OF THE INVENTION

It is an object of the invention to provide a tracking error detection device and a tracking error detection method which can detect a tracking error even for an optical disk of high density recording.

According to an embodiment of the present invention, a tracking error detection device for an optical disk apparatus comprises:

a detecting unit which includes at least two detectors and detects a reflected light from a series of pits formed on an optical disk;

a phase comparing unit which detects a phase difference of outputs of the at least two detectors; and a low-pass filter which smoothes an output of the phase comparing unit, a cut-off frequency of the low-pass filter being higher than a frequency at which a spectrum of a modulation code recorded in the optical disk becomes −10 dB and lower than a frequency at which the spectrum of the modulation code recorded in the optical disk becomes −5 dB.

According to another embodiment of the present invention, a tracking error detection method for an optical disk apparatus comprising:

detecting a reflected light from a series of pits formed on an optical disk by using at least two detectors;

detecting a phase difference of outputs of the at least two detectors; and smoothing the detected phase difference by using a low-pass filter of which cut-off frequency is higher than a frequency at which a spectrum of a modulation code recorded in the optical disk becomes −10 dB and lower than a frequency at which the spectrum of the modulation code recorded in the optical disk becomes −5 dB.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of a tracking error detection device according to the present invention will now be described with reference to the accompanying drawings.

FIRST EMBODIMENT

A first embodiment aims to detect the tracking error in reproducing the optical disk such as DVD-ROM and DVD-RAM. The modulation code of the recording data is recorded in the form of the series of pits (a physical shape bringing about an optical change in the reflected light of the laser beam) in a recording layer (optical reflection layer) of DVD-ROM. The 4/6 modulation code or the 8/12 modulation code is used as the modulation coding method and the run-length ranges from 1 to 10 (RLL (1, 10)). The recording layer of DVD-RAM is one in which the information is recorded in spiral grooves and lands as a phase state bringing about an optical change in the reflected light of the laser beam, and the tracking error is detected not with the detection device using the phase difference method but with the detection device using a push-pull method. However, even in DVD-RAM, a lead-out area is provided on the outer peripheral side of an information area, a lead-in area is provided on the inner peripheral side of the information area adjacent to a clamp area, and the information is recorded by the series of pits in the lead-out area and lead-in area, so that the tracking error detection device using the differential phase detection method can be utilized.

Figure 1:
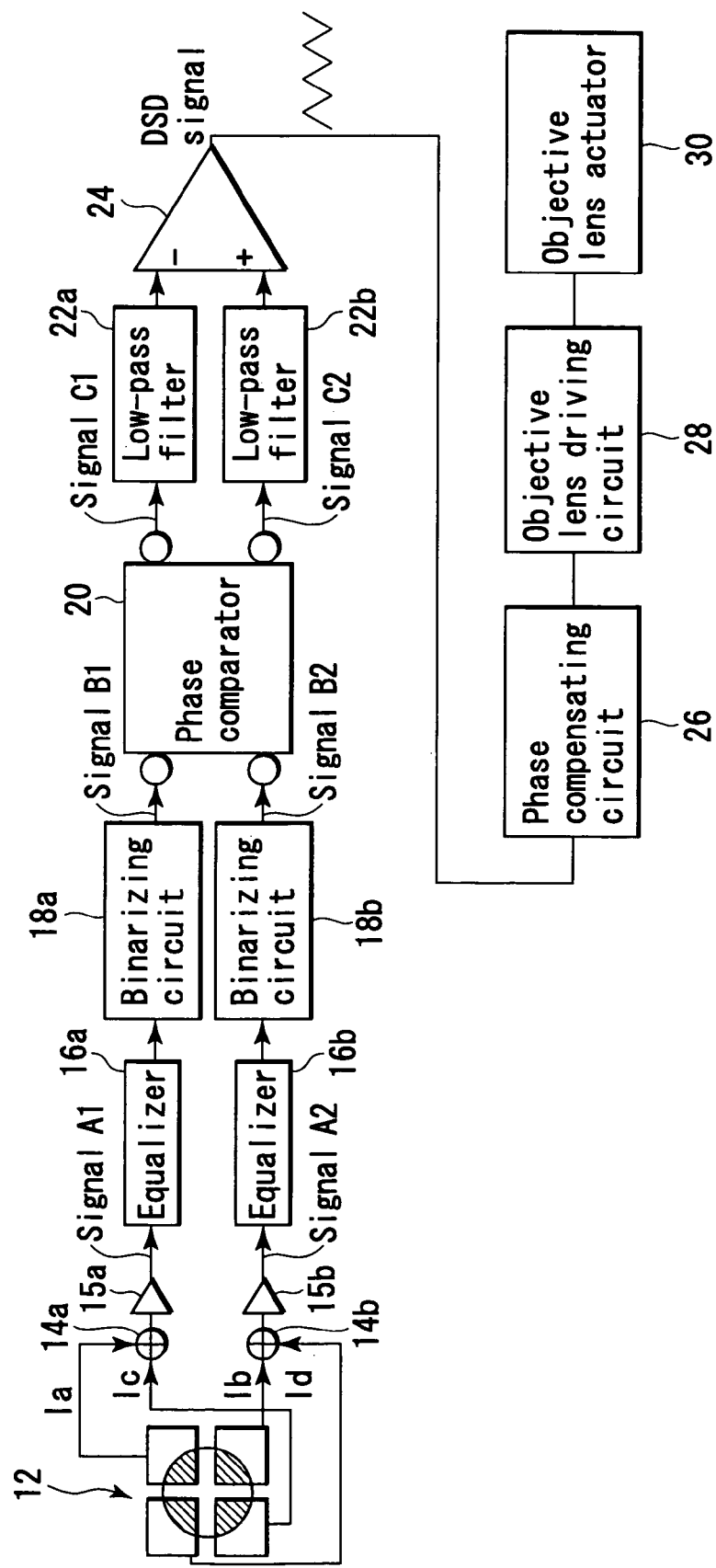
FIG. 1 is a block diagram showing a configuration of a tracking error detection device according to a first embodiment of the invention.
Figure 2:
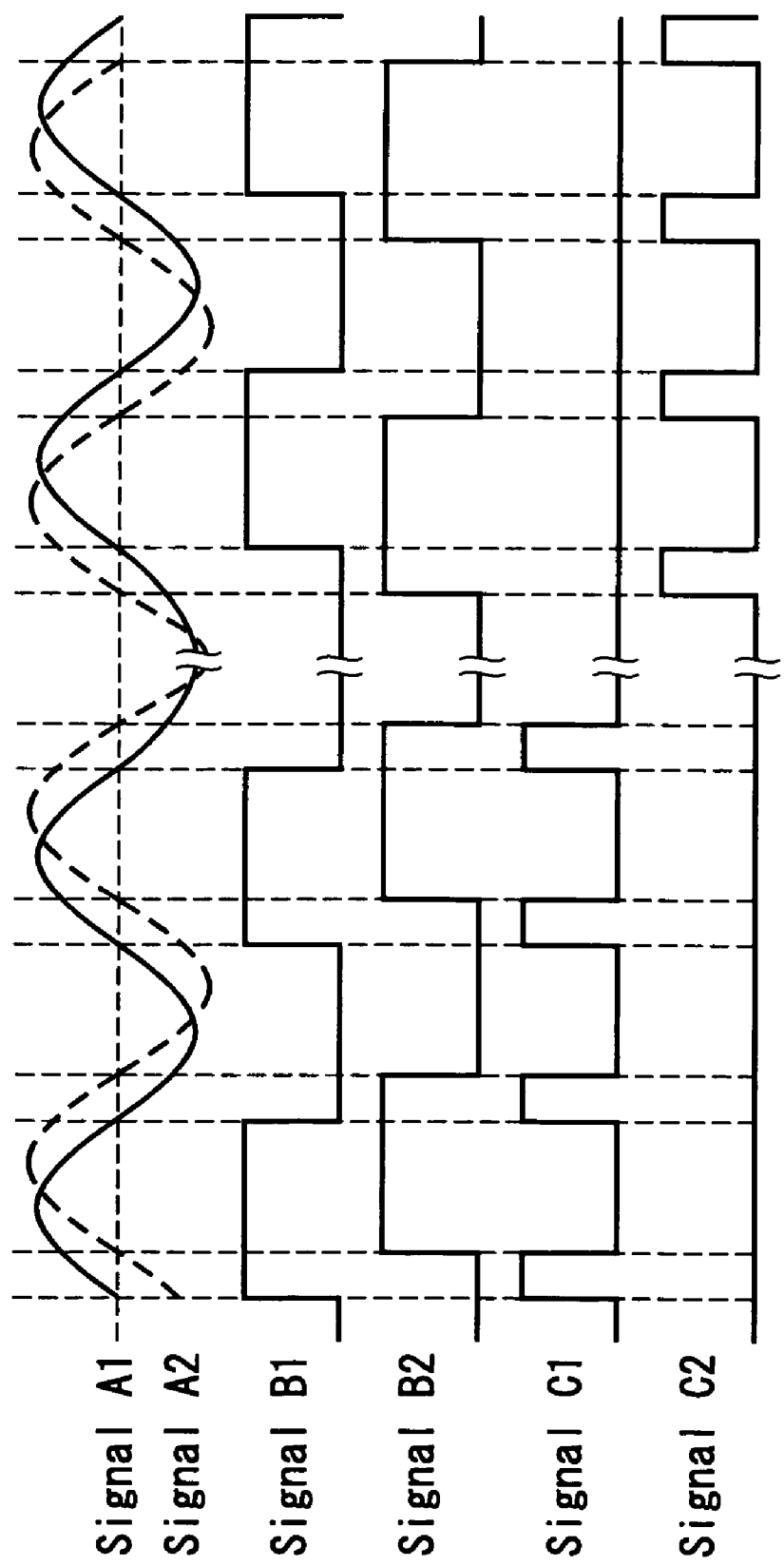
FIG. 2 shows a waveform chart of the device of FIG. 1.

FIG. 1 is a block diagram of a whole of a tracking servo apparatus including one embodiment of the tracking error detection device according to the invention. FIG. 2 is a waveform chart of the apparatus. The tracking servo apparatus includes a quadrant photodetector 12, adders 14a and 14b, amplifiers 15a and 15b, equalizers 16a and 16b, binarizing circuits 18a and 18b, a phase comparator 20, low-pass filters 22a and 22b, a differential amplifier 24, a phase compensating circuit 26, an objective lens driving circuit 28, and an objective lens actuator 30.

The optical disk is irradiated with the laser beam (not shown), and the quadrant photodetector 12 receives the reflected light from the series of pits of the optical disk to output each of detection signals Ia, Ib, Ic, and Id from each detection element. The adders 14a and 14b add outputs of two diagonal detection elements in the quadrant photodetector 12. Specifically, sum signals Ia+Ic and Ib+Id of the detection signals of the detection elements, which are diagonally arranged relative to the center of the track, are output from the adders 14a and 14b.

Since the high frequency component is lost by OTF (Optical Transfer Function) of the optical disk in the signals after performing the addition, in order to compensate the lost high frequency component, the waveforms of the output signals from the adders 14a and 14b are equalized with the equalizers 16a and 16b. The outputs of the adders 14a and 14b are supplied in the form of signals A1 and A2 to the equalizers 16a and 16b through the amplifiers 15a and 15b (see FIG. 2).

The outputs of the equalizers 16a and 16b are binarized with the binarizing circuits 18a and 18b to form binary signals B1 and B2 having the pulse width according to the mark length of the pit on the optical disk (see FIG. 2).

The outputs B1 and B2 of the binarizing circuits 18a and 18b are supplied to the phase comparator 20. The phases of the outputs B1 and B2 of the binarizing circuits 18a and 18b are in-phase when the center of the laser beam coincides with the center of the pit, and the phases of the outputs B1 and B2 have the phase difference according to the deviation when the center of the laser beam is shifted from the center of the pit. The phase comparator 20 detects the phase difference between the outputs B1 and B2 of the binarizing circuits 18a and 18b to output phase-difference detection signals C1 and C2 (see FIG. 2). The phase-difference detection signals C1 is output when a leading edge of the output B1 is advanced relative to the leading edge of the output B2, and the phase-difference detection signals C2 is output when a leading edge of the output B2 is advanced relative to the leading edge of the output B2.

The two phase-difference detection signals C1 and C2 output from the phase comparator 20 are supplied to the low-pass filters 22a and 22b and smoothed. Since the high frequency component relative to the servo band which is the modulation component of the information recorded in the optical disk is included as the noise in the phase-difference detection signals C1 and C2, the high-frequency component relative to the servo band is removed by smoothing the phase-difference detection signals C1 and C2 with the low-pass filters.

The outputs of the low-pass filters 22a and 22b are supplied to the differential amplifier 24 having the gain of 1, a differential signal between the phase-difference detection signals C1 and C2 is amplified, and the result is set to a tracking error signal DPD. The tracking error signal DPD is one in which a level is changed according to the deviation between the laser beam and the pit. The tracking error signal DPD is supplied to the phase compensating circuit 26 to compensate the phase, and then the tracking error signal DPD is converted into driving current with the objective lens driving circuit 28 and supplied to the objective lens actuator 30 including a voice coil motor. This enables an objective lens (not shown) to move according to the tracking error, as a result, the center of the laser beam corresponds to the center of the pit.

As mentioned above, when the laser beam spot is deviated from the center of the pit, the phase difference is generated between the binary signals B1 and B2 and reflected in the phase-difference detection signals C1 and C2. The tracking error signal DPD becomes a value higher than the central value when the phase of the binary signal B1 is advanced relative to the phase of the binary signal B2, and the tracking error signal DPD becomes the value lower than the central value when the phase of the binary signal B2 is advanced relative to the phase of the binary signal B1. An extent in which the tracking error signal is deviated from the central value corresponds to the extent in which the laser spot is deviated from the center of the track.

The phase comparator 20 detects the phase difference between the leading edges of the binary signals B1 and B2 and the phase difference between the trailing edges of the binary signals B1 and B2. The leading edges and trailing edges of the binary signals B1 and B2 correspond to the edges of the pit recorded on the optical disk. Therefore, the detection device shown in FIG. 1 detects the phase difference one by one in each edge of the pit recorded on the optical disk.

Figure 3:
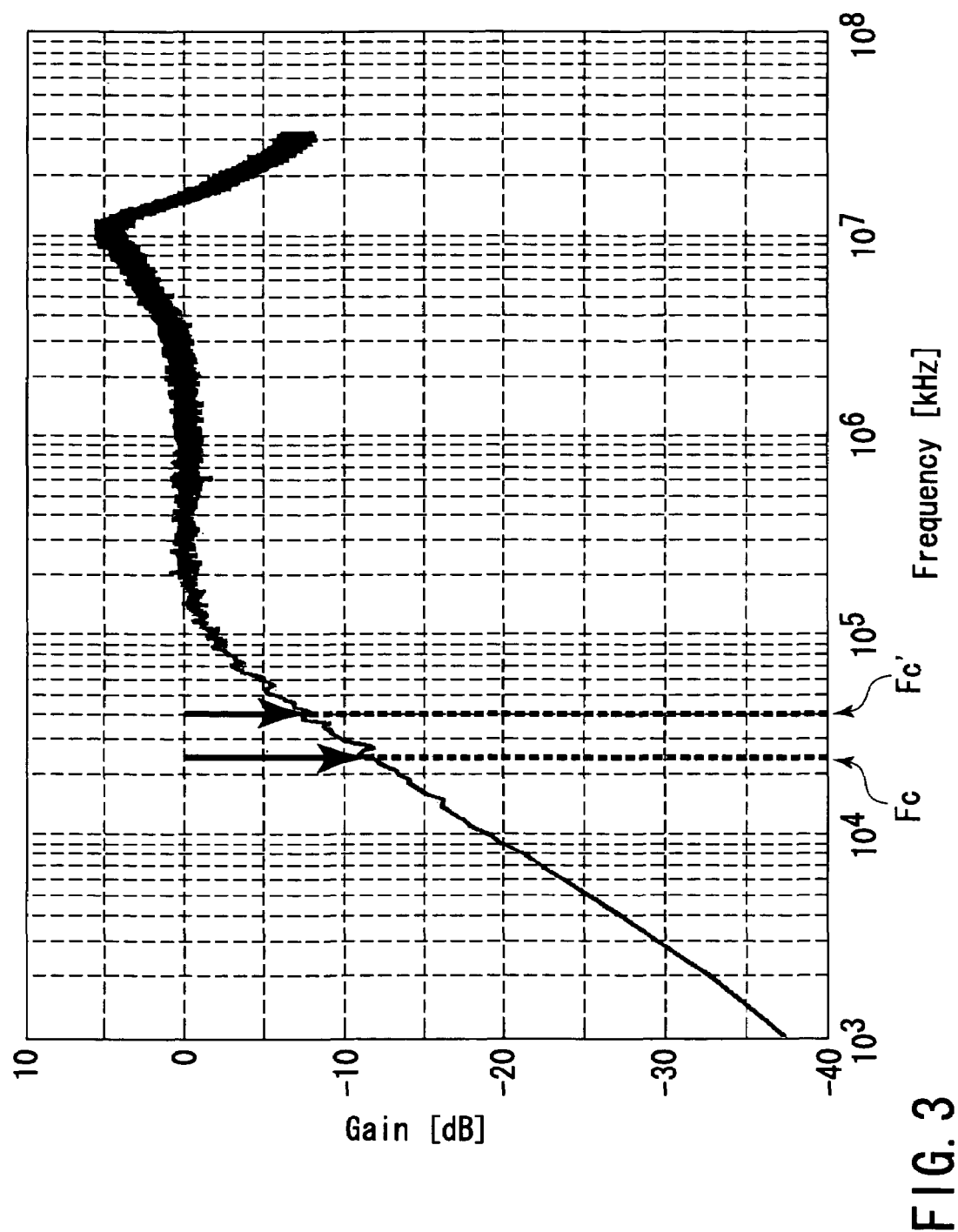
FIG. 3 shows a power density spectrum distribution of a modulation code in the first embodiment.

As described in the background, since the phases in the phase difference signals output from the phase comparator 20 are compared when the code of the modulation signal recorded in the optical disk is changed, the modulation code has the low-frequency component relative to the channel frequency (the high-frequency component relative to the servo band). The low-pass filters 22a and 22b are connected in order to remove the low-frequency component relative to the channel frequency of the modulation code. In the embodiment, a cut-off frequency of the low-pass filter is determined as follows:

FIG. 3 shows a power density spectrum distribution of the modulation code of the information recorded in the optical disk in the embodiment. Fc' is the frequency at which the spectrum of the modulation code becomes −7 dB relative to the frequency component of the code before the modulation, and Fc' is about 40 KHz in this case. Fc is the frequency at which the spectrum of the modulation code recorded in the optical disk becomes −11 dB relative to the frequency component of the code before the modulation, and Fc is about 21.2 KHz in this case. The frequency of higher than Fc and of at most 60 KHz at which the spectrum of the modulation code becomes −5 dB relative to the frequency component of the code before the modulation is set to the cut-off frequency in the embodiment. It is preferable that the cut-off frequency is in the above-mentioned range, and it is more preferable that the cut-off frequency is at least 40 KHz which is 8 times of the frequency band of the tracking servo apparatus (5 KHz in the embodiment). This is because the cut-off frequency of the low-pass filter and the frequency band of the tracking servo circuit may interfere with each other when the cut-off frequency is close to the frequency band.

In the embodiment, a track pitch Tp of DVD is 0.4 μm and a pit pitch Pp is 0.102 μm. In the case where the cut-off frequency is set to 40 KHz, it was confirmed from experiments that a residual of the modulation component in the tracking error signal was at most ±0.04 μm. In the case where the residual is in the range, it was found that an error rate of a reproducing signal was as small as $1 \times 10^{-5}$. This is the sufficient level in which the information can be reproduced without the error.

As described above, according to the first embodiment, even in the case where the minimum mark length is shortened in order to increase the recording density of the optical disk and the modulation code has the large spectrum in the low-frequency component relative to the channel frequency in order to increase efficiency of the modulation code, the phase difference signal can be smoothed to remove the noise, i.e., the modulation component of the recording code, i.e., the high-frequency component, and the tracking error can be correctly detected.

Figure 4:
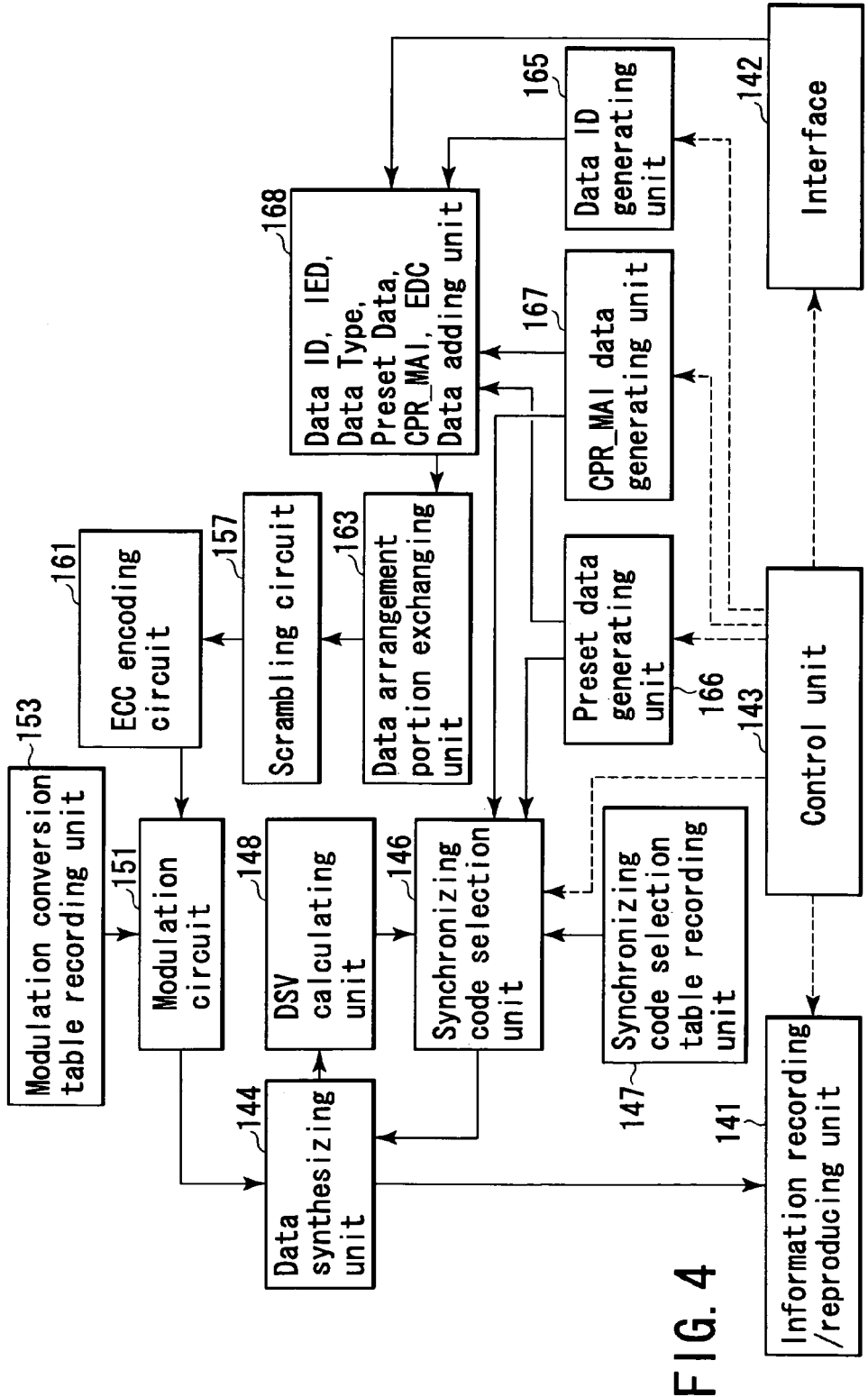
FIG. 4 shows a configuration of a recording system of an optical disk apparatus to which the tracking error detection device of FIG. 1 is applied.
Figure 5:
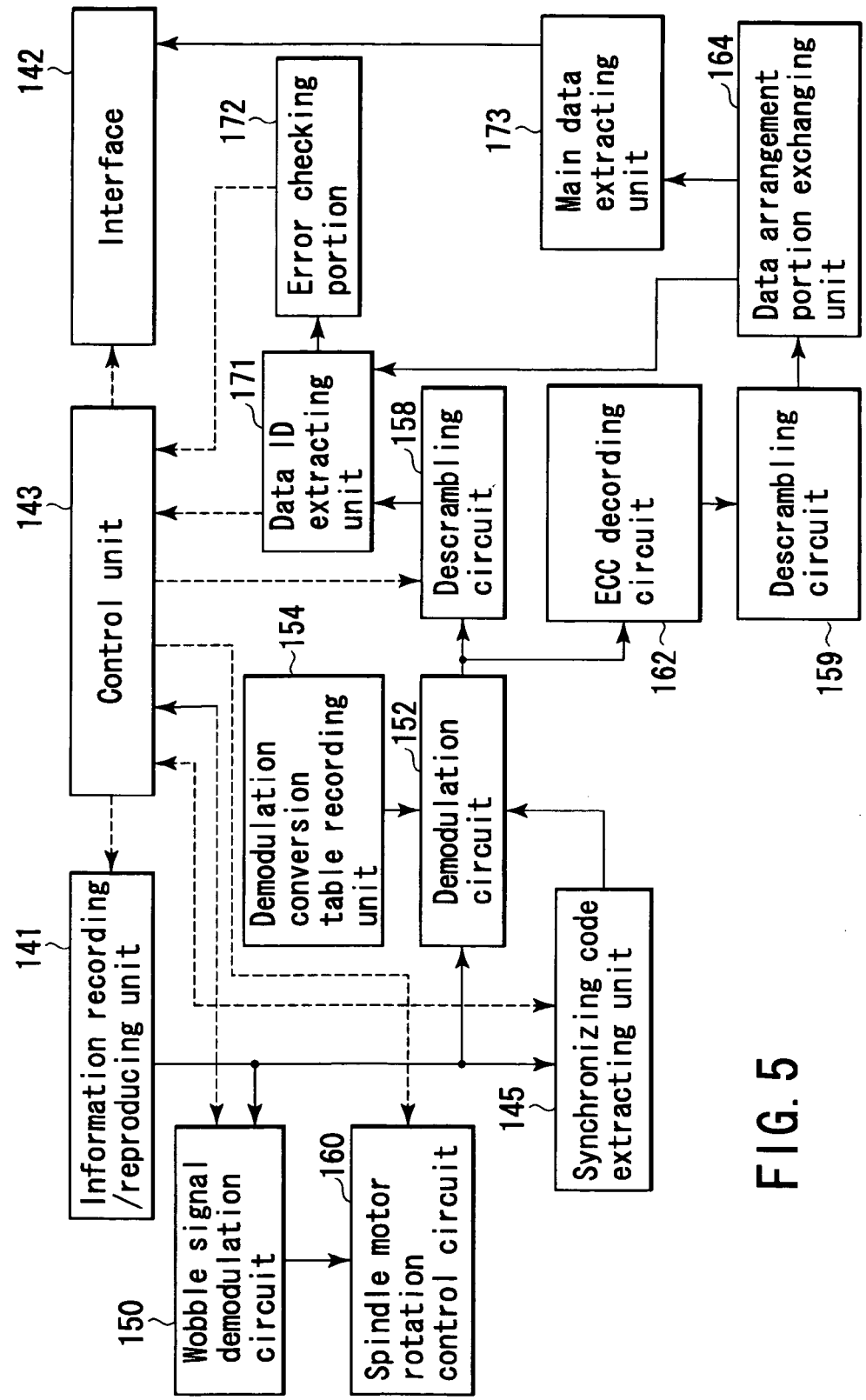
FIG. 5 shows a configuration of a reproducing system of the optical disk system to which the tracking error detection device of FIG. 1 is applied.

Next, signal processing of the optical disk apparatus to which the tracking error detection device of the embodiment is applied will be described. FIG. 4 shows a structure with respect to a recording system of an information recording/reproducing apparatus and FIG. 5 shows the structure with respect to a reproducing system of information recording/reproducing apparatus. In FIG. 4, data is captured in an interface 142. The captured main data is guided to a data adding unit 168, data processing is performed, and recording data is generated.

The recording data includes a data frame, a scrambled frame, a recording frame or a recording data field. The data frame includes 2,048 bytes and has main data, a 4-byte data ID, a 2-byte ID error detection (IED) code, a 6-byte reserved byte, and a 4-byte error detection code (EDC). After the error detection code (EDC) is added, the main data is scrambled by a scramble circuit 157. At this point, a Cross Reed-Solomon error correction code is adapted to the 32 scrambled data frames (scrambled frame) to perform so-called ECC encode processing. As a result, the recording frame is generated. The recording frame includes a parity of outer code (PO) and a parity of inner code (PI). PO and PI are the error correction code generated for each ECC block including each 32 scrambled frames. The recording data field is modulated in the form of the 4/6 modulation or 8/12 modulation, and a synchronizing code (SYNC) is added to a front end in every 91 bytes to generate the recording frame. The four recording data fields are recorded in one data field.

Referring to FIG. 4, a data ID generating unit 165 outputs the data ID and supplies it to the data adding unit 168. A CPR_MAI data generating unit 167 outputs data concerning copy protect and supplies it to the data adding unit 168. A preset data generating unit 166 outputs preset data and supplies it to the data adding unit 168. The data output from the data adding unit 168 is formed in a scrambled frame arrangement with a data arrangement portion exchanging unit 163, and the main data part is scrambled with a scrambling circuit 157.

In the ECC block, the data arrangement portion exchanging unit 163 handles (6 rows×172 bytes) unit as one scrambled frame. The scrambled frame arrangement includes the 32 continuous scrambled frames. Further, in the system, (block 182 bytes×207 bytes) are handled as a pair. The scrambled frames are arranged while L is added to each number of the scrambled frames of the ECC block on the left side and R is added to each number of the scrambled frames of the ECC block on the right side. That is to say, the right and left scrambled frames are alternately present in the ECC block on the left side, and the right and left scrambled frames are alternately present in the ECC block on the right side. The ECC block includes 32 continuous scrambled frames. Each row of a left half of an odd-number sector is exchanged for each row of the right half. 172×2 bytes×192 rows are equal to 172 bytes×12 rows×32 scrambled frames and those become an information field. The 16-byte PO is added to each of 172×2 rows in order to form an outer code of RS (208, 192, 17). Further, the 10-byte PI of RS (182, 172, 11) is added to each of 208×2 rows in the right and left blocks. PI is also added to the row of PO. The number within the frame indicates the scrambled frame number, and R and L of the suffix mean the right half and left half of the scrambled frame respectively.

In an ECC encoding circuit 161, PO and PI are added to the output of the scrambling circuit 157 and interleaving of PO is performed. The obtained ECC block is input to a modulation circuit 151 to become the modulation signal. 16 parity rows are dispersed into each one row in the interleaving of PO. That is to say, the 16 parity rows are arranged one by one for each of the two recording frames. Therefore, the recording frame including 12 rows becomes 12 rows+1 row. After the interleaving of the row is performed, 13 rows×182 bytes are referenced as the recording frame. Accordingly, the ECC block is the 32 recording frames after the interleaving of the row is performed. Each of 6 rows of the right and left blocks is in one recording frame. POs are arranged so as to be located in the different rows in the left block (182×208 bytes) and the right block (182×208 bytes).

At this point, the modulation code of a modulation conversion table 153 is selected according to the input data. In a data synthesizing unit 144, a synchronizing code is added to the modulation data from the modulation circuit 151.

A synchronizing code selection unit 146 selects the synchronizing code from a synchronizing code selection table recording unit 147. A DSV calculating unit 148 controls the selection of the synchronizing code so that the run of "0" and "1" is in a predetermined range in a part where the synchronizing code and the data are continued. The data synthesizing unit 144 supplies a recording signal to an information recording/reproducing unit 141. A control unit 143 controls entire blocks.

In FIG. 5, a reproducing system is shown. The signal output from the information recording/reproducing unit 141 is input to a wobble signal demodulation circuit 150, a synchronizing code position extracting unit 145, and a demodulation circuit 152. A wobble signal demodulated with the wobble signal demodulation circuit 150 becomes a reference signal of, e.g., a spindle motor rotation control circuit 160. The synchronizing code (SYNC) extracted with the synchronizing code position extracting unit 145 controls timing of the demodulation circuit 152. The demodulation circuit 152 demodulates the modulation signal using a conversion table recorded in a demodulation conversion table recording unit 154. The demodulation signal demodulated is input to an ECC decoding circuit 162. The ECC decoding circuit 162 processes the ECC block. That is to say, the ECC decoding circuit 162 sets PO to an original state and uses PO (16 bytes) and PI (10 bytes) to perform error correction processing. A descrambling circuit 159 descrambles the main data part. Then, a data arrangement portion exchanging unit 164 restores the row, in which the right and left blocks are exchanged, to an arrangement position of the original block. In this state, a main data extracting unit 173 can extract the demodulated main data and the data is output through the interface 142. The output of the data arrangement portion exchanging unit 164 is supplied to a data ID extracting unit 171. The extracted data ID is input as recognition data and timing data to the control unit 143. A part of the data ID is descrambled with a descrambling circuit 158. Error checking is performed in an error checking unit 172. When the data ID is not normal, the control unit 143 performs the data capture again.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, though the DPD TE method was described as the error detection method, except the DPD TE method, the differential phase detection method also includes such that 1) A method in which the waveform of an output signal from each detection element is equalized with the equalizer without performing addition, the phase difference is independently calculated in back and forth direction of the detector corresponding to the series of pits, and the obtained phase difference signal is added to pass it through the low-pass filter; and 2) A method in which the phase difference between a PLL (Phase Locked Loop) clock of an RF signal and an equalizing signal in which the waveform of each output signal from each detection element is equalized with the equalizer is calculated, and the obtained phase difference signal is added and subtracted to pass it through the low-pass filter can be used as long as the modulation component of the phase difference signal, i.e., the high frequency component relative to the servo band is removed with the low-pass filter.

As described above, according to the invention, the tracking error detection device which can detect the tracking error even for the optical disk of high density recording can be provided.

What is claimed is:

1. A tracking error detection device for an optical disk apparatus using a modulation coding method in which a minimum value of a run-length is 1, the device comprising:
   a detecting unit which includes at least two detectors and detects a reflected light from a series of pits formed on an optical disk;
   a phase comparing unit which detects a phase difference of outputs of the at least two detectors; and
   a low-pass filter which smoothes an output of the phase comparing unit, a cut-off frequency of the low-pass filter being higher than a frequency at which a spectrum of a modulation code recorded in the optical disk becomes −10 dB relative to a frequency component of a code before modulation and lower than a frequency at which the spectrum of the modulation code recorded in the optical disk becomes −5 dB.

2. A tracking error detection device according to claim 1, wherein the cut-off frequency of the low-pass filter is at least 8 times of a frequency band of tracking servo control of the optical disk apparatus.

3. A tracking error detection device for an optical disk apparatus using a modulation coding method in which a minimum value of a run-length is 1, the device comprising:
   a detecting unit which includes four detectors diagonally arranged relative to a center of a pit formed on an optical disk and detects a reflected light from a series of pits formed on the optical disk;
   an adder which adds two outputs of two sets of two detectors diagonally arranged and outputting a first detection signal and a second detection signal;

an equalizer which equalizes a waveform of the first detection signal and the second detection signal in order to compensate high-frequency components of the first and second detection signals;

a binarizing unit which binarizes equalized first and second detection signals;

a phase difference detecting unit which detects a phase difference of binarized first and second detection signals; and a low-pass filter which smoothes an output of the phase difference detecting unit, a cut-off frequency of the low-pass filter being higher than a frequency at which a spectrum of a modulation code recorded in the optical disk becomes −10 dB relative to a frequency component of a code before modulation and lower than a frequency at which a spectrum of the modulation code recorded in the optical disk becomes −5 dB.

4. A tracking error detection device according to claim 3, wherein the cut-off frequency of the low-pass filter is at least 8 times of a frequency band of tracking servo control of the optical disk apparatus.

5. A tracking error detection method for an optical disk apparatus using a modulation coding method in which a minimum value of a run-length is 1, the method comprising:

detecting a reflected light from a series of pits formed on an optical disk by using at least two detectors;

detecting a phase difference of outputs of the at least two detectors; and smoothing the detected phase difference by using a low-pass filter of which cut-off frequency is higher than a frequency at which a spectrum of a modulation code recorded in the optical disk becomes −10 dB relative to a frequency component of a code before modulation and lower than a frequency at which the spectrum of the modulation code recorded in the optical disk becomes −5 dB.

6. A tracking error detection method according to claim 5, wherein the cut-off frequency of the low-pass filter is at least 8 times of a frequency band of tracking servo control of the optical disk apparatus.

7. A tracking error detection method for an optical disk apparatus using a modulation coding method in which a minimum value of a run-length is 1, the method comprising:

detecting a reflected light from a series of pits formed on an optical disk unit by using four detectors which diagonally arranged relative to a center of a pit formed on the optical disk;

adding two outputs of two sets of two detectors diagonally arranged and outputting a first detection signal and a second detection signal;

equalizing a waveform of the first detection signal and the second detection signal in order to compensate high-frequency components of the first and second detection signals;

binarizing the equalized first and second detection signals;

detecting a phase difference of the binarized first and second detection signals; and smoothing the detected phase difference by using a low-pass filter of which cut-off frequency is higher than a frequency at which a spectrum of a modulation code recorded in the optical disk becomes −10 dB relative to a frequency component of a code before modulation and lower than a frequency at which a spectrum of the modulation code recorded in the optical disk becomes −5 dB.

8. A tracking error detection method according to claim 7, wherein the cut-off frequency of the low-pass filter is at least 8 times of a frequency band of tracking servo control of the optical disk apparatus.

* * * * *